(12) United States Patent
Watanabe et al.

(10) Patent No.: US 10,766,148 B2
(45) Date of Patent: Sep. 8, 2020

(54) HAND MECHANISM WITH THREE-DIMENSIONAL CAMS

(71) Applicant: SHINANO KENSHI KABUSHIKI KAISHA, Nagano (JP)

(72) Inventors: Sadaaki Watanabe, Nagano (JP); Kimihiro Takehana, Nagano (JP); Yutaka Nagai, Nagano (JP)

(73) Assignee: SHINANO KENSHI KABUSHIKI KAISHA, Nagano (JP)

(*) Notice: Subject to any disclaimer, the term of this patent is extended or adjusted under 35 U.S.C. 154(b) by 0 days.

(21) Appl. No.: 16/193,579

(22) Filed: Nov. 16, 2018

(65) Prior Publication Data
US 2019/0143534 A1 May 16, 2019

(30) Foreign Application Priority Data
Nov. 16, 2017 (JP) .................. 2017-221258

(51) Int. Cl.
B25J 15/02 (2006.01)
B25J 15/10 (2006.01)
F16H 25/18 (2006.01)
F16H 53/06 (2006.01)

(52) U.S. Cl.
CPC ........... B25J 15/0226 (2013.01); B25J 15/10 (2013.01); F16H 25/18 (2013.01); F16H 53/06 (2013.01)

(58) Field of Classification Search
CPC .... B25J 15/0226; B25J 15/0028; B25J 15/10; F16H 25/04; F16H 25/18; F16H 53/06
See application file for complete search history.

(56) References Cited

U.S. PATENT DOCUMENTS

| 7,654,788 | B2* | 2/2010 | Rogalla .................. B25J 15/106 294/106 |
| 8,418,572 | B2 | 4/2013 | Takahashi et al. |
| 8,585,111 | B2* | 11/2013 | Nammoto ................. B25J 15/10 294/106 |
| 8,942,851 | B1* | 1/2015 | Maier ...................... B25J 15/04 700/245 |
| 9,486,927 | B1* | 11/2016 | Morey ..................... B25J 15/10 |
| 2006/0182603 | A1* | 8/2006 | Hawes ................. B25J 15/0253 414/735 |

FOREIGN PATENT DOCUMENTS

JP 4448554 4/2010

* cited by examiner

Primary Examiner — Stephen A Vu
(74) Attorney, Agent, or Firm — Stephen J. Weyer, Esq.; Stites & Harbison, PLLC

(57) ABSTRACT

A hand mechanism includes three-dimensional cams and claw portions configured to open and close in association with a rotary motion of the three-dimensional cams and achieves a compact and multifunctional configuration. A rotor shaft is a hollow shaft provided with a hollow shaft hole, is assembled in communication with a through hole formed in a cam base portion of a cam pedestal member, and is provided with a functional part in the hollow shaft hole.

7 Claims, 10 Drawing Sheets

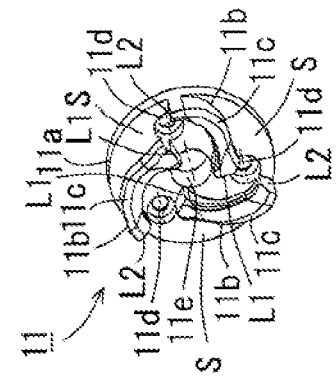
FIG.3C
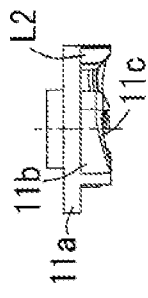
FIG.3D
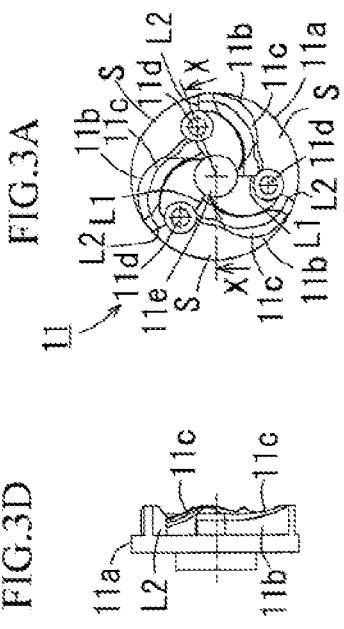
FIG.3A
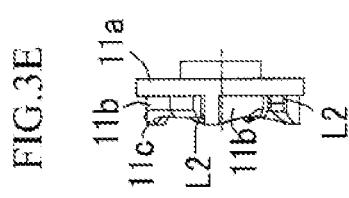
FIG.3E
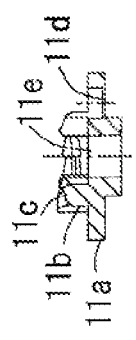
FIG.3F
CROSS SECTION X-X
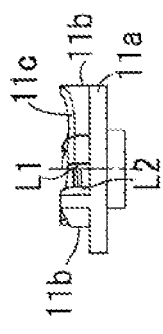
FIG.3B
FIG.3G

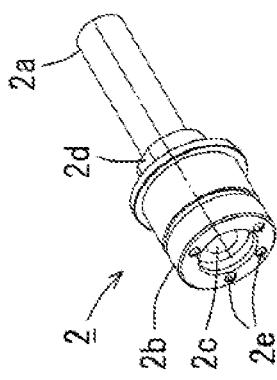
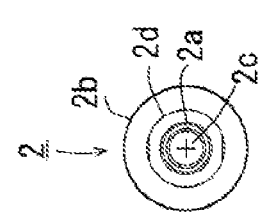
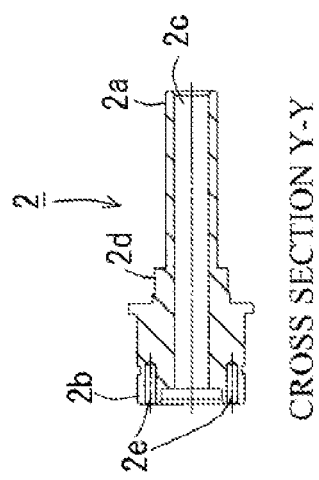
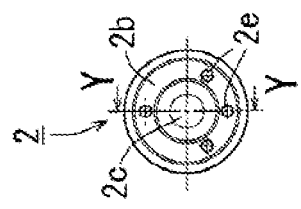
FIG.4A  FIG.4B  FIG.4C  FIG.4D  FIG.4E

HAND MECHANISM WITH THREE-DIMENSIONAL CAMS

CROSS-REFERENCE TO RELATED APPLICATION

This application is based upon and claims the benefit of priority of the prior Japanese Patent Application No. 2017-221258, filed on Nov. 16, 2017, and the entire contents of which are incorporated herein by reference.

TECHNICAL FIELD

The present disclosure relates to a cam-type hand mechanism provided with a three-dimensional cam.

BACKGROUND ART

In the related art, for bending and stretching of joints of robot hands or robot arms, rotary drive of a drive source is transmitted by various driving mechanisms such as a gear mechanism or a wire motion mechanism. The gear mechanism has problems such as low controllability due to backrush of gears and size or weight increases due to the presence of gear trains, while the wire motion mechanism has problems such as low controllability due to the necessity of adjustment of wire tension and probability of wire elongation, and increases in number of parts and size due to the necessity of a mechanism for rotating the wire.

As countermeasures for these problems, a three-dimensional cam mechanism is proposed. The three-dimensional cam mechanism includes a cam rotary shaft coupled to a motor shaft and supported by a supporting member, and is configured to convert a rotary motion of a three-dimensional cam into a swinging motion of a driven-side link by the driven-side link supported by the above-described supporting member being guided by a cam guiding surface of the three-dimensional cam rotating about the cam rotary shaft. Accordingly, with a flexible design of a shape of the cam guiding surface, a smooth swinging motion of the driven-side link is achieved without causing backrush as in the gear mechanism (see PTL 1; Japanese Patent No. 4448554, PTL 2; Japanese Patent No. 4388566).

SUMMARY OF INVENTION

Technical Problem

In the three-dimensional cam mechanism in PTL 1 and PTL 2 described above, for example, for taking an image of a gripping object or cleaning the gripping object by blowing air in addition to an operation for gripping the gripping object with a hand mechanism, actions such as fixing and lifting the gripping object with another hand mechanism may be required, which makes an apparatus large-scale and thus requires a larger workspace correspondingly.

Instead of such a large-scale apparatus provided with a plurality of robot hands that perform different operating actions for executing different operations as described above, there is a need for achievement of a compact and multifunctional configuration by making a single hand mechanism perform other operations in addition to an opening-and-closing operation of the robot hand.

Solution to Problem

In response to the above issue, one or more aspects of the present invention are directed to a cam-type hand mechanism including a three-dimensional cam and claw portions configured to open and close in association with a rotary motion of the three-dimensional cam and achieving a compact and multifunctional configuration.

Embodiments according to the present invention described below have following configurations.

An aspect of the present disclosure provides a cam-type hand mechanism including: a motor; a cam pedestal member, the cam pedestal member including a cam base portion detachably assembled directly or indirectly to a rotor shaft extending from the motor and a three-dimensional cam including a plurality of cam guiding surfaces continuing over a range from a through hole provided at a center of the cam base portion to an outer peripheral side and being formed upright at a plurality of positions; and a hand mechanism assembled to the motor constantly in abutment with the three-dimensional cam, the hand mechanism including a plurality of claw portions openable and closable about an axial line of the rotor shaft in association with a rotary motion of the three-dimensional cam, in which the rotor shaft is a hollow shaft provided with a hollow shaft hole, is assembled in communication with the through hole formed in the cam base portion of the cam pedestal member, and is provided with a functional part in the hollow shaft hole.

According to the configuration described above, the rotor shaft is the hollow shaft provided with the hollow shaft hole, is assembled in communication with the through hole formed in the cam base portion of the cam pedestal member, and is provided with a functional part in the hollow shaft hole. Therefore, parallel utilization of a gripping action of the hand mechanism for gripping a gripping object and the functional part provided in the hollow shaft hole achieves the compact and multifunctional configuration of the cam-type hand mechanism.

The functional part may be an imaging device inserted into the hollow shaft hole. Accordingly, the imaging device is positioned on an axial line of the rotor shaft, and thus is capable of taking images of the gripping object positioned on an extension of the axial line without fail.

The functional part may be a storage space for storing the gripping object gripped by the claw portions in the hollow shaft hole.

Accordingly, the gripping object gripped by the claw portions may be taken out in a state of being stored in the storage space, and thus the operation is enabled even in a small workspace. Consequently, the operability is improved.

The functional part may be an air suction and injection device inserted into the hollow shaft hole and configured to suck air or inject air.

Accordingly, operations such as sucking air from and injecting air against the gripping object gripped by the hand mechanism may be performed in a space-saving manner.

The functional part may be a measuring device inserted into the hollow shaft hole.

Accordingly, necessary information may be acquired by measuring dimensions and distance, for example, by irradiating the gripping object gripped by the hand mechanism with laser beams or sound waves.

The functional part may be an information reading device inserted into the hollow shaft hole.

Accordingly, an action of the hand mechanism may be controlled by reading data such as a bar code or a QR code (registered trademark) marked on the gripping object gripped by the hand mechanism.

Preferably, the hand mechanism includes a hand base portion assembled to the motor; and claw supporting portions configured to rotatably support the claw portions about an axis orthogonally disposed with respect to a direction of the axial line of the rotor shaft, and the claw portions slide in a state in which a plurality of cam follower surfaces provided at root end portions of the claw portions are in constantly abutment with the plurality of corresponding cam guiding surfaces.

Accordingly, the cam pedestal member assembled directly or indirectly to the rotor shaft rotates in association with the rotation of the motor, the plurality of cam follower surfaces provided at the root end portions of the claw portions slide in constantly abutment with the cam guiding surfaces of the corresponding three-dimensional cams in association with the rotary motion of the three-dimensional cams. Consequently, the plurality of claw portions may open and close without generating rattling due to a thrust about the axial line of the rotary shaft, and moreover, upsizing may be avoided even when the functional part is provided in the through hole formed at the center of the cam base portion to achieve multifunctional configuration.

Advantageous Effects of Invention

A cam-type hand mechanism including a three-dimensional cam and claw portions configured to open and close in association with a rotary motion of the three-dimensional cam and achieving a compact and multifunctional configuration may be provided.

BRIEF DESCRIPTION OF DRAWINGS

FIGS. 3A to 3G are a plan view, front, back, left, and right views, a cross-sectional view taken along the line X-X, and a perspective view of the cam pedestal member illustrated in FIGS. 1A to 1E.

FIGS. 4A to 4E are a front elevation, left, and right side views, a cross-sectional view taken along the line Y-Y, and a perspective view of the motor shaft.

DESCRIPTION OF EMBODIMENTS

Figure 1:
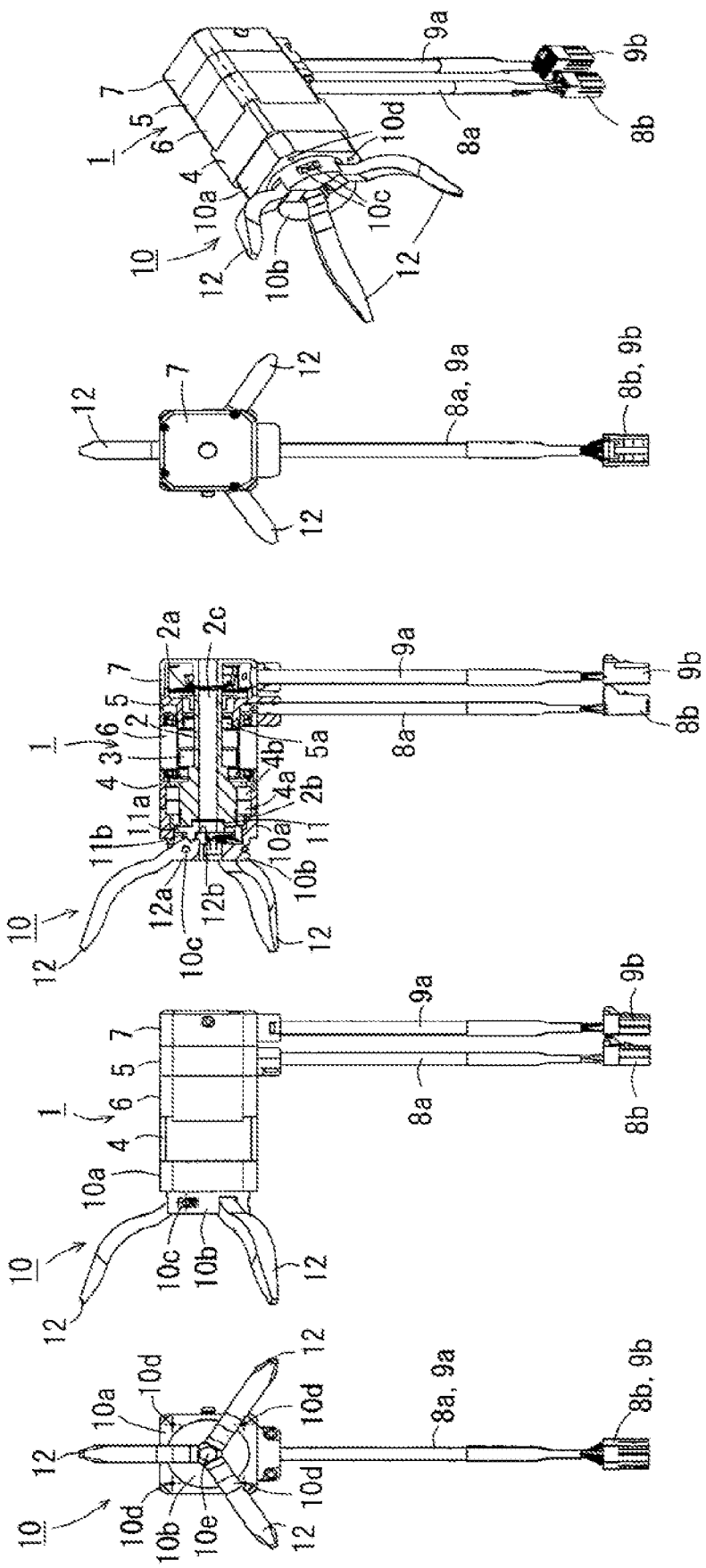
FIGS. 1A to 1E are a front elevation, a right side view, a vertical cross-sectional view, a rear view, and a perspective view of a cam-type hand mechanism having three claw portions.

Referring now to the accompanied drawings, an embodiment of a cam-type hand mechanism according to the present invention will be described.

Referring firstly to FIG. 1A to FIG. 4E, a cam-type hand mechanism having three claw portions will be described.

A stepping motor 1 as illustrated in FIG. 1C is used as a drive source for the cam-type hand mechanism. Other motors such as a brushless motor may be used instead of the stepping motor 1. The stepping motor 1 includes a rotor shaft 2 (motor shaft) and a rotor 3 provided with rotor pole teeth and integrally assembled to the rotor shaft 2. The rotor 3 may be of a hybrid type including a permanent magnet clamped in a rotor core. The rotor shaft 2 is rotatably supported to a bearing retaining member 5 via a bearing 5a at one end 2a in a longitudinal direction and to a bearing retaining member 4 via bearings 4a, 4b at the other end 2b in the longitudinal direction. A hollow shaft is desirably used as the rotor shaft 2. A stator 6 having a stator core is provided around the rotor 3. The stator core is provided with fixing pole teeth so as to oppose the rotor pole teeth. A coil is wound around the stator pole teeth via an insulator. An encoder 7 having an encoder disk is provided at the one end 2a of the rotor shaft 2 (see FIGS. 1C and 1D). A connecting line 8a configured to supply electricity to a coil and a connector 8b, and a signal line 9a connected to the encoder 7 and a connector 9b are respectively connected. The other end 2b of the rotor shaft 2 is provided with a hand mechanism 10 including claw portions 12 configured to be openable and closable about an axial line at three positions (see FIGS. 1A, 1B, 1C, and 1E). The claw portions 12 provided at the three positions are provided to be openable and closable at positions shifted in phase by every 120 degrees about the rotor shaft 2 (see FIG. 1A).

In FIG. 1C, a cam pedestal member 11 is detachably assembled to the other end 2b of the rotor shaft 2. The cam pedestal member 11 is provided with a plurality of three-dimensional cams. The hand mechanism 10 is integrally assembled to the bearing retaining member 4 in constantly abutment with three-dimensional cams 11b, described later, and a plurality of the claw portions 12 are configured to open and close in association with a rotary motion of the three-dimensional cams 11b.

The cam pedestal member 11 is assembled directly to the rotor shaft 2. However, when a decelerator is assembled to the rotor shaft 2 of the stepping motor 1, the cam pedestal member 11 may be assembled to the rotor shaft 2 indirectly via the decelerator.

Referring now to FIGS. 3A to 3G, a configuration of the cam pedestal member 11 will be described. A cam base portion 11a of the cam pedestal member 11 is detachably assembled directly or indirectly to the rotor shaft 2 extending from the stepping motor 1. The three-dimensional cams 11b including a plurality of cam guiding surfaces 11c continuing over a range from a through hole 11e provided at a center of the cam base portion 11a to an outer peripheral side are formed upright at a plurality of positions (three positions, for example). In FIG. 3A, the three-dimensional cams 11b are provided over a range from a portion in the vicinity of the through hole 11e of the cam base portion 11a to an outer peripheral edge portion. Each of the cam guiding surfaces 11c of the three-dimensional cams 11b is formed into a curved surface continuing along the longitudinal direction of the three-dimensional cams 11b. The cam base portion 11a is provided with cam-side screw holes 11d (coupling portions) for coupling the rotor shaft 2 and the cam pedestal member 11 at three positions in axial symmetry. Each of the cam-side screw holes 11d is formed at a gap area S (see FIGS. 3A and 3G) between a radially inner end L1 of one three-dimensional cam 11b and a radially outer end L2 of adjacent three-dimensional cam 11b. A through hole 11e communicating with a hollow shaft hole 2c (see FIG. 1C) of the rotor shaft 2 is formed at the center of the cam base portion 11a. The cam-side screw holes 11d do not necessarily have to be formed in axial symmetry.

According to the configuration described above, the cam base portion 11a provided with a plurality of the three-dimensional cams 11b includes the cam-side screw holes 11d for coupling the rotor shaft 2 and the cam pedestal member 11 at a plurality of positions in the gap areas S formed between the radially inner ends L1 and the radially outer ends L2 of the adjacent three-dimensional cams 11b. Therefore, the cam pedestal member 11 and the hand mechanism 10 may be downsized compared with a case where the cam-side screw hole 11d is provided on an outer peripheral side of the three-dimensional cams 11b formed on the cam base portion 11a, and the hand mechanism 10 may be replaced with a hand mechanism 10 different in number and shape of the claw portions by attaching and detaching the cam pedestal member 11 with respect to the rotor shaft 2. In particular, since the cam-side screw holes 11d are provided in the gap areas S between the radially inner end L1 and the radially outer end L2 of the adjacent three-dimensional cams 11b, upsizing in the radical direction of the cam pedestal member 11 is avoided. In addition, upsizing as a result of multifunctioning such as provision of imaging unit at the center of the cam base portion 11a may be avoided. When a plurality of the cam-side screw holes 11d are formed in axial symmetry, the cam pedestal member 11 has no directionality for attachment and detachment to and from the rotor shaft 2, and thus replacement of the hand mechanism 10 is easily achieved.

Referring now to FIGS. 4A to 4E, a configuration of the rotor shaft 2 will be described.

As illustrated in FIGS. 4A to 4E, the one end 2a of the rotor shaft 2 is coupled to the stepping motor 1. The rotor 3 is assembled to the rotor shaft 2 having a smaller diameter and is assembled with the rotor core abutted to a shouldered portion 2d. The other end 20 of the rotor shaft 2 has a larger diameter and the bearing retaining member 4 is assembled to an outer periphery via the bearings 4a, 4b (see FIG. 1C). The other end 2b of the rotor shaft 2 includes motor-side screw holes 2e (coupling portion) corresponding to the cam-side screw holes 11d provided in the cam base portion 11a at three positions. Accordingly, attachment and detachment of the cam pedestal member 11 to and from the other end portion of the rotor shaft 2 are achieved by aligning the cam-side screw holes 11d and the motor-side screw holes 2e. Note that another motor-side screw hole 2e is provided at a position different in phase by 180 degrees from at least one of the motor-side screw holes 2e provided at the three positions (See FIG. 4B). This additional motor-side screw hole 2e is provided for replacement of the hand mechanism 10 with a hand mechanism 10 having claw portions 12a at two positions by replacing the cam pedestal member 11 as described later.

In this manner, coupling screws are screwed into the cam-side screw holes 11d and the motor-side screw holes 2e aligned to each other to detachably assemble the cam pedestal member 11 to the rotor shaft 2. Therefore, the hand mechanism 10 may be replaced with other hand mechanisms 10 having claw portions different in number or shape by simply replacing the cam pedestal member 11.

An example of the hand mechanism 10 will now be described. A hand base member 10a covers an outer periphery of the cam base portion 11a when being assembled to the stepping motor 1. Specifically, the hand base member 10a may be integrally assembled to the stepping motor 1 side by aligning screw holes 10d provided at four corners of the hand base portion 10a and screw holes 4d provided on a corresponding end surface 4c of the bearing retaining member 4 (see FIG. 2) and fastening with screws, not illustrated (see FIG. 1E). The hand base member 10a is provided with a claw supporting member 10b. The claw supporting member 10b includes the claw portions 12 provided at three positions. Each of the claw portions 12 is axially supported by the claw supporting member 10b in a manner rotatable about a shaft 10c disposed orthogonally to a direction of the axial line of the rotor (See FIGS. 1B and 1E). The claw portions 12 slide in a state in which a plurality of cam follower surfaces 12b provided at root end portions 12a are in constantly abutment with the corresponding plurality of cam guiding surfaces 11c (see FIG. 1C and FIG. 3A). The claw supporting member 10b is also provided with a through hole 10e (see FIG. 1A) communicating with the through hole 11e at a center thereof.

Accordingly, the cam pedestal member 11 assembled to the rotor shaft 2 rotates in association with the rotation of the motor 1, the cam follower surfaces 12b provided at the root end portions 12a slide in constantly abutment with the cam guiding surfaces 11c of the corresponding three-dimensional cams 11b in association with the rotary motion of the three-dimensional cams 11b. Consequently, the claw portions 12 provided at three positions about the axial line of the rotor shaft 2 may open and close without generating rattling due to a thrust (see FIG. 1C).

In addition, as described above, the rotor shaft 2 is a hollow shaft, and the cam base portion 11a is respectively provided with the through hole 11e (see FIG. 3A) communicating with the hollow shaft hole 2c and the claw supporting member 10b is provided with the through hole 10e communicating with the through hole 11e (see FIG. 1A). Accordingly, a multifunctional configuration is achieved by using the through hole 11e of the cam base portion 11a communicating with the hollow shaft hole 2c of the rotor shaft 2 and the through hole 10e of the claw supporting member 10b (see FIG. 1A) as a storage space 2f of a gripping object 13 as described later, or by using various gimmicks through the hollow shaft hole 2c from the motor 1 side.

Figure 2:
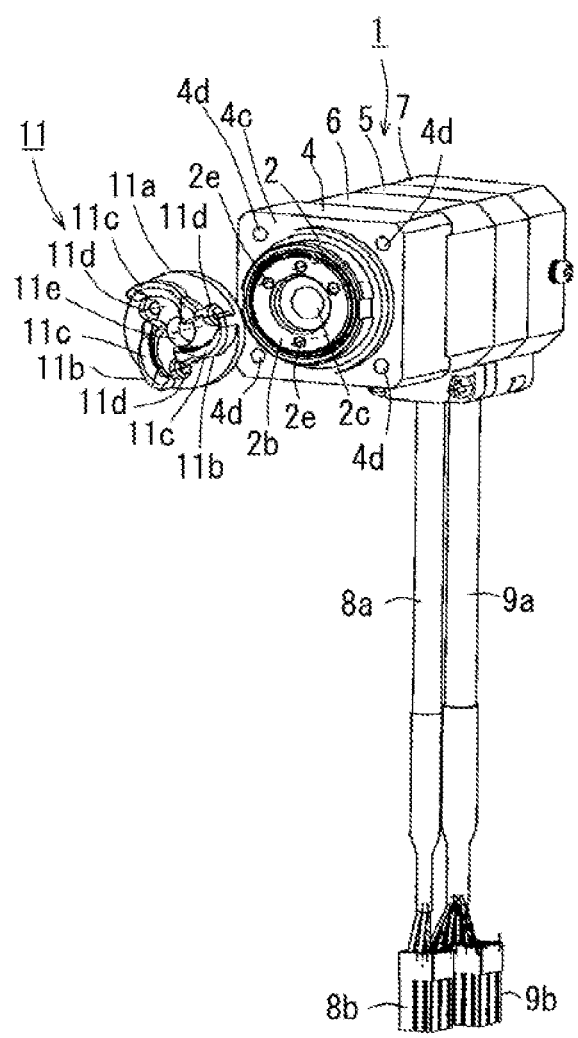
FIG. 2 is a perspective view illustrating a state in which a cam pedestal member and a hand mechanism (not illustrated) are removed from a motor shaft.

In order to replace the hand mechanism 10, the hand mechanism 10 is demounted from the stepping motor 1 by removing screws, not illustrated, from the screw holes 10d (see FIGS. 1A and 1E) provided at the four corners of the hand base member 10a. Subsequently, as illustrated in FIG. 2, the cam pedestal member 11 and the hand mechanism 10 may be replaced with new ones by demounting the cam pedestal member 11 from the other end 2b of the rotor shaft 2 by removing the screws, not illustrated, from the cam-side screw holes 11d provided at three positions of the cam pedestal member 11.

As described thus far, the present disclosure provides the cam-type hand mechanism 10 including the three-dimensional cams 11b and the claw portions 12 configured to open and close in association with the rotary motion of the three-dimensional cam 11b, and requiring minimum replacement parts of the hand mechanism 10 to reduce maintenance costs and prevent or reduce upsizing in association with multifunctionality of the hand mechanism 10.

Figure 5:
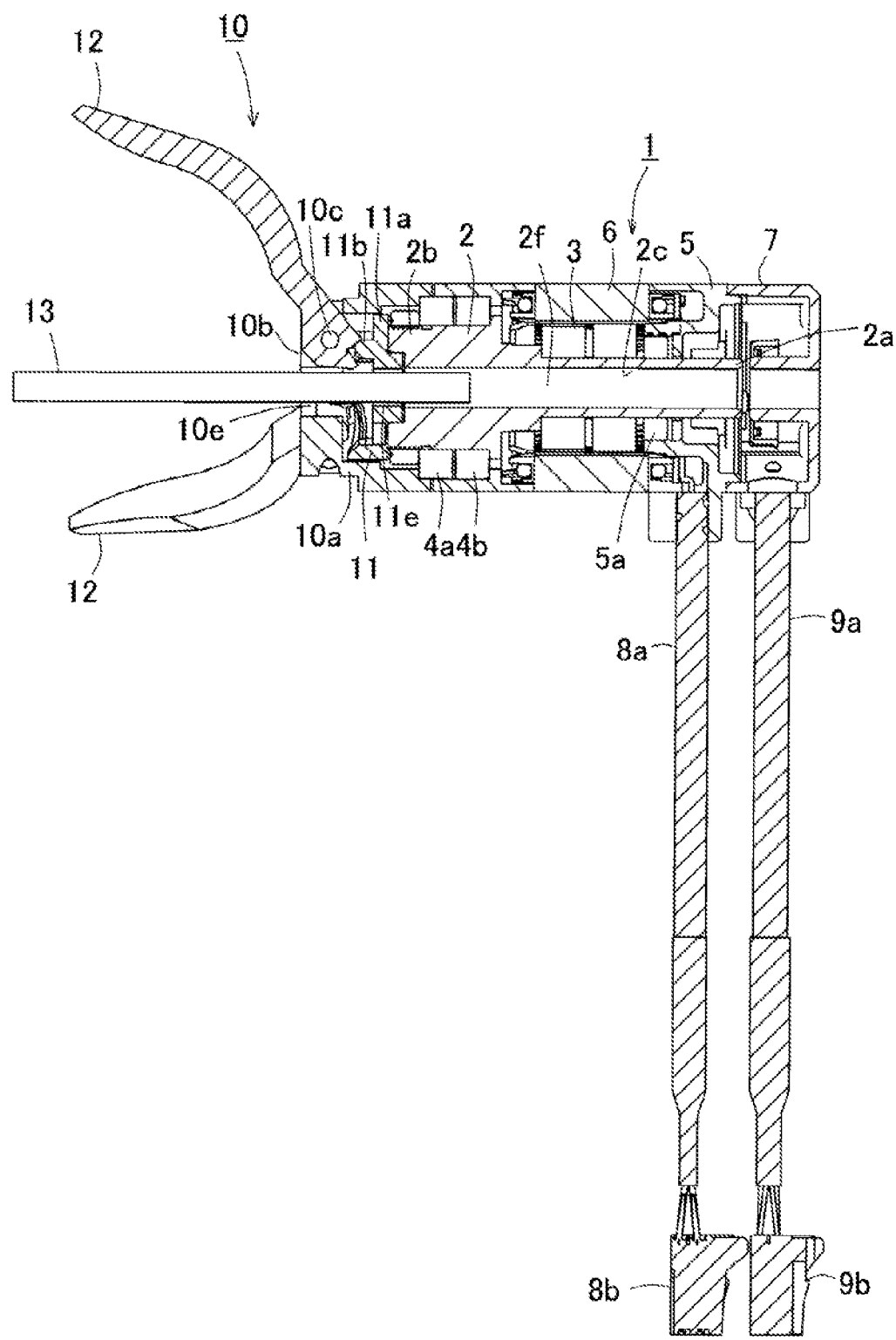
FIG. 5 is a cross-sectional view of the cam-type hand mechanism in use.
Figure 6:
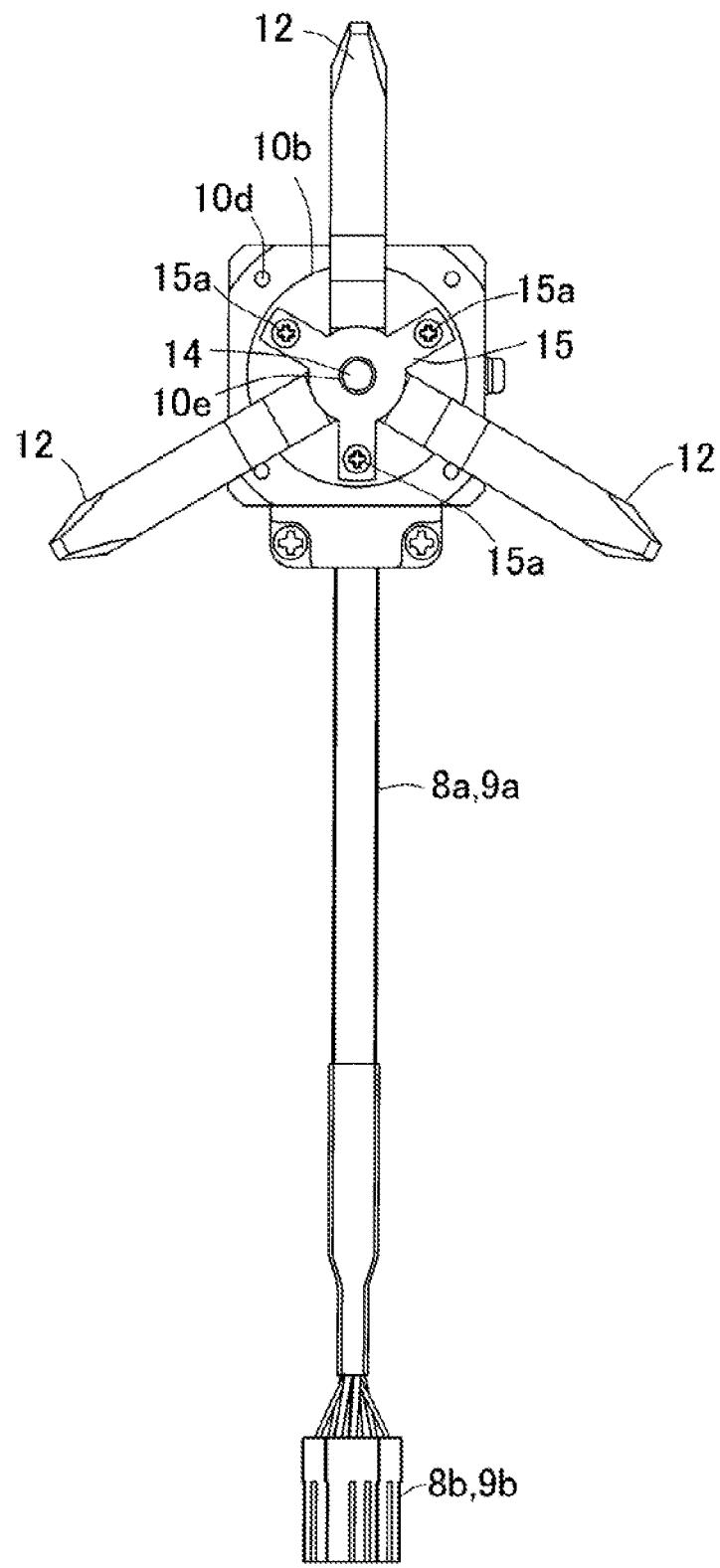
FIG. 6 is a front elevation of a cam-type hand mechanism according to another example in use.
Figure 7:
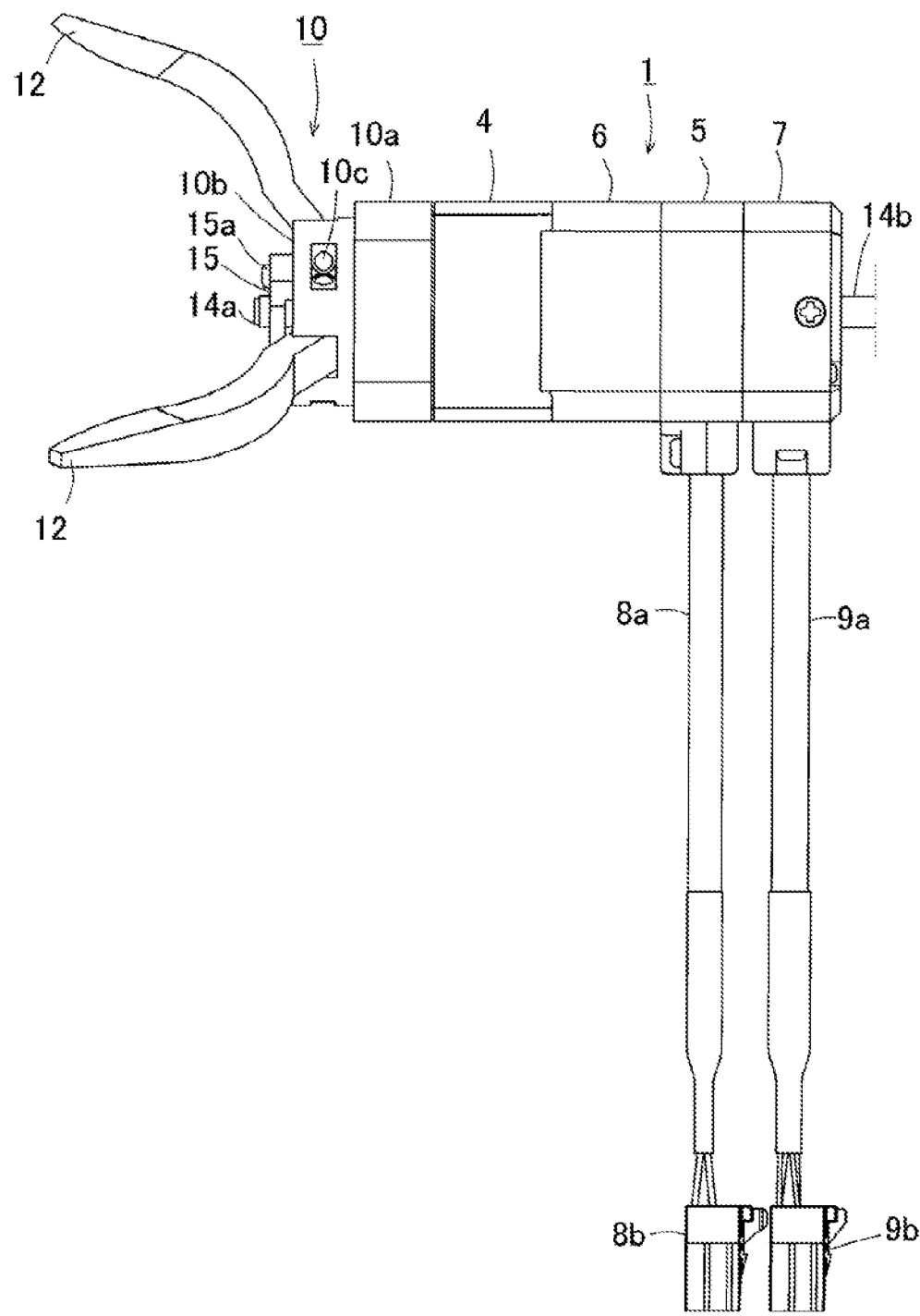
FIG. 7 is a right side view of the cam-type hand mechanism in FIG. 6.

FIG. 5 illustrates an example of the cam-type hand mechanism in use. In this embodiment, the storage space 2f is provided in the hollow shaft hole 2c of the rotor shaft 2 as a functional part. The gripping object 13 gripped by the claw portions 12 of the hand mechanism 10 is stored in the storage space 2f. The claw portions 12 provided at three positions in the hand mechanism 10 slide along the three-dimensional cams 11b and thus is capable of opening and closing without generating rattling due to a thrust and gripping the gripping object 13 on an extension of the axial line of the rotor shaft 2. Specifically, when the gripping object 13 has a rod shape, the gripping object 13 may be guided through the through hole 11e of the cam pedestal member 11 and the through hole 10e of the hand mechanism 10 into the hollow shaft hole 2c in a state of being gripped by the claw portions 12, and the gripping object 13 may be stored in the storage space 2f in the hollow shaft hole 2c of the rotor shaft 2. Accordingly, the gripping object 13 gripped by the claw portions 12 may be taken out in a state of being stored in the storage space 2f, and thus the operation is enabled even in a small workspace. Consequently, the operability is improved. In addition, the gripping object 13 longer than the claw portions 12 may be gripped in a stabled manner.

Note that the gripping object 13 may be collected into the storage space 2f by performing an air-sucking action from inside the hollow shaft hole 2c, or may be collected to a collecting portion (not illustrated) connected to the hollow shaft hole 2c.

Figure 8:
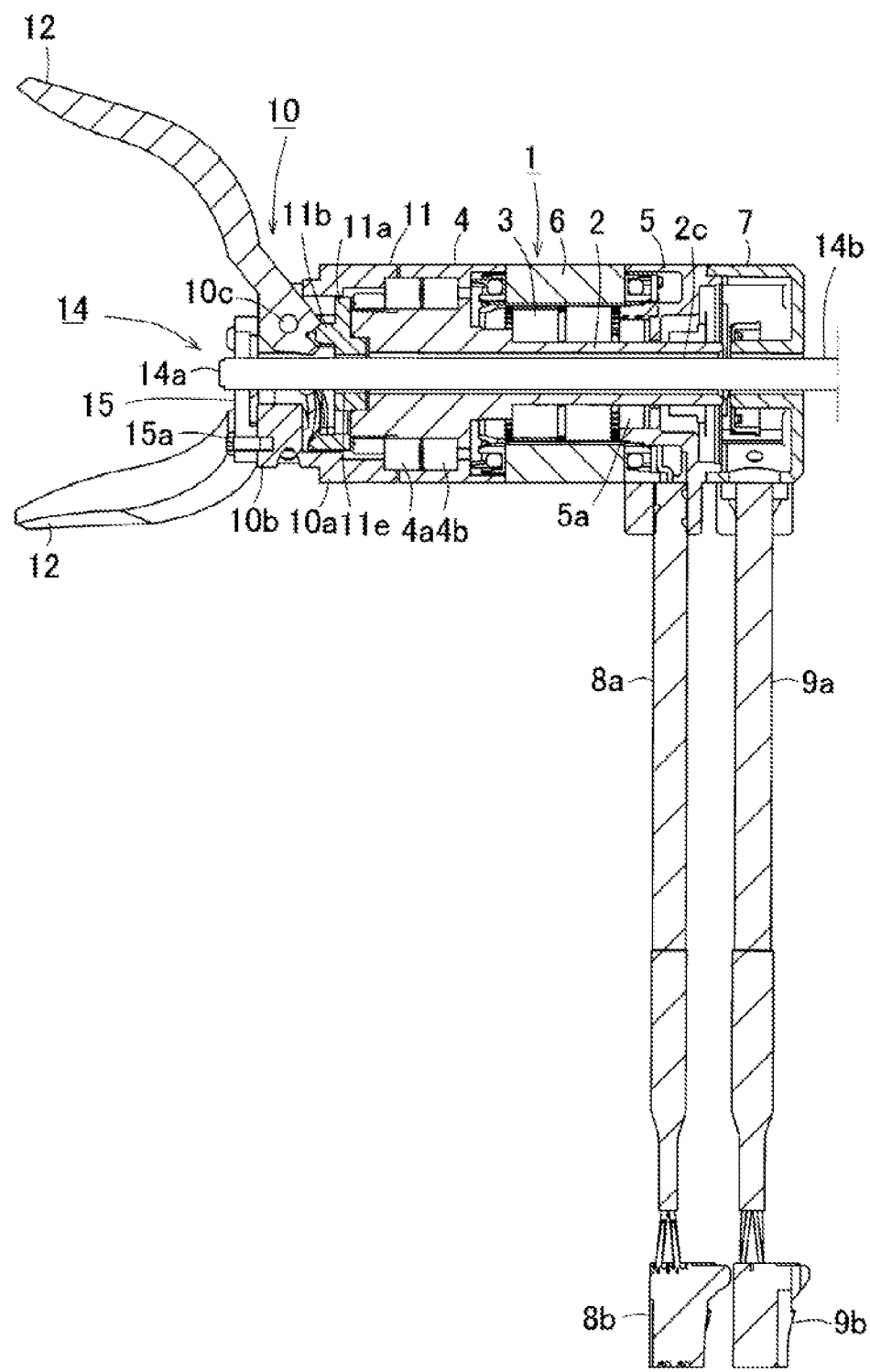
FIG. 8 is a cross-sectional view of the cam-type hand mechanism in FIG. 6 taken along the line X-X.
Figure 9:
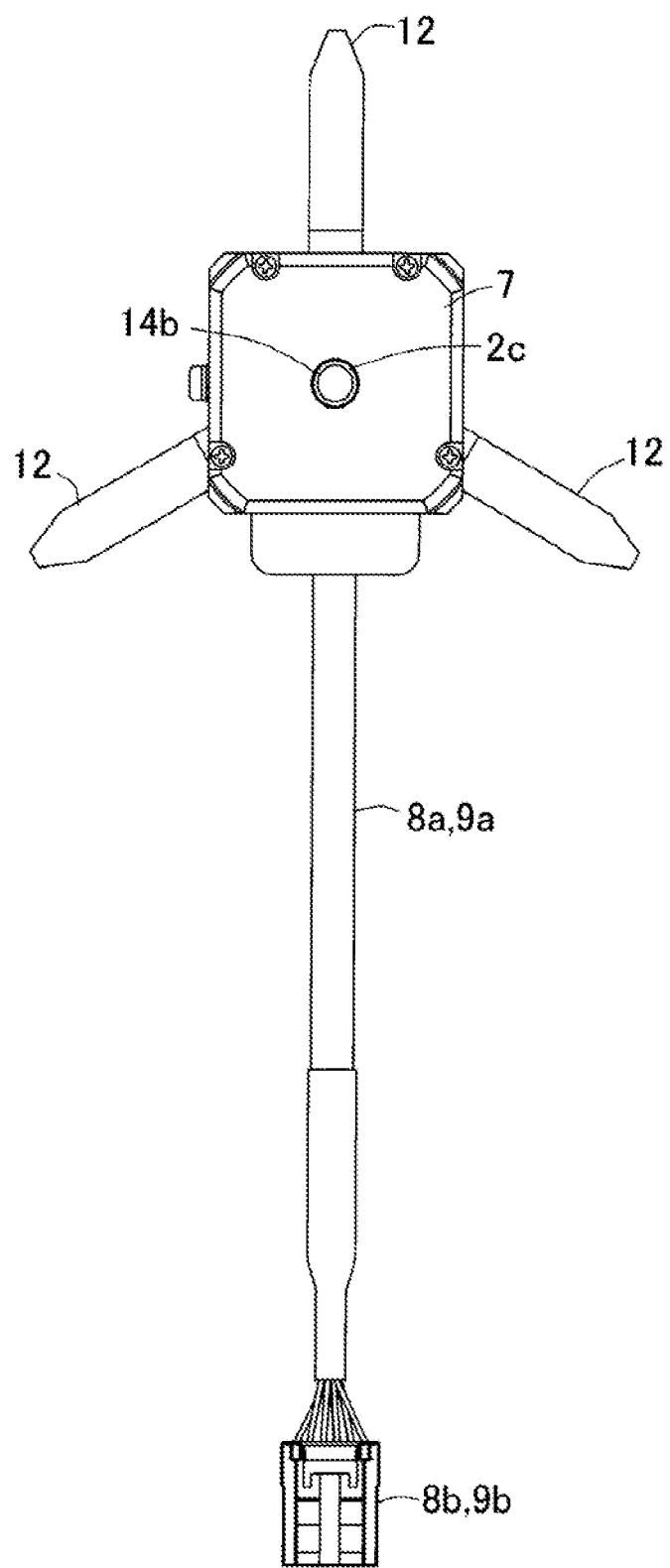
FIG. 9 is a rear view of the cam-type hand mechanism in FIG. 6.
Figure 10:
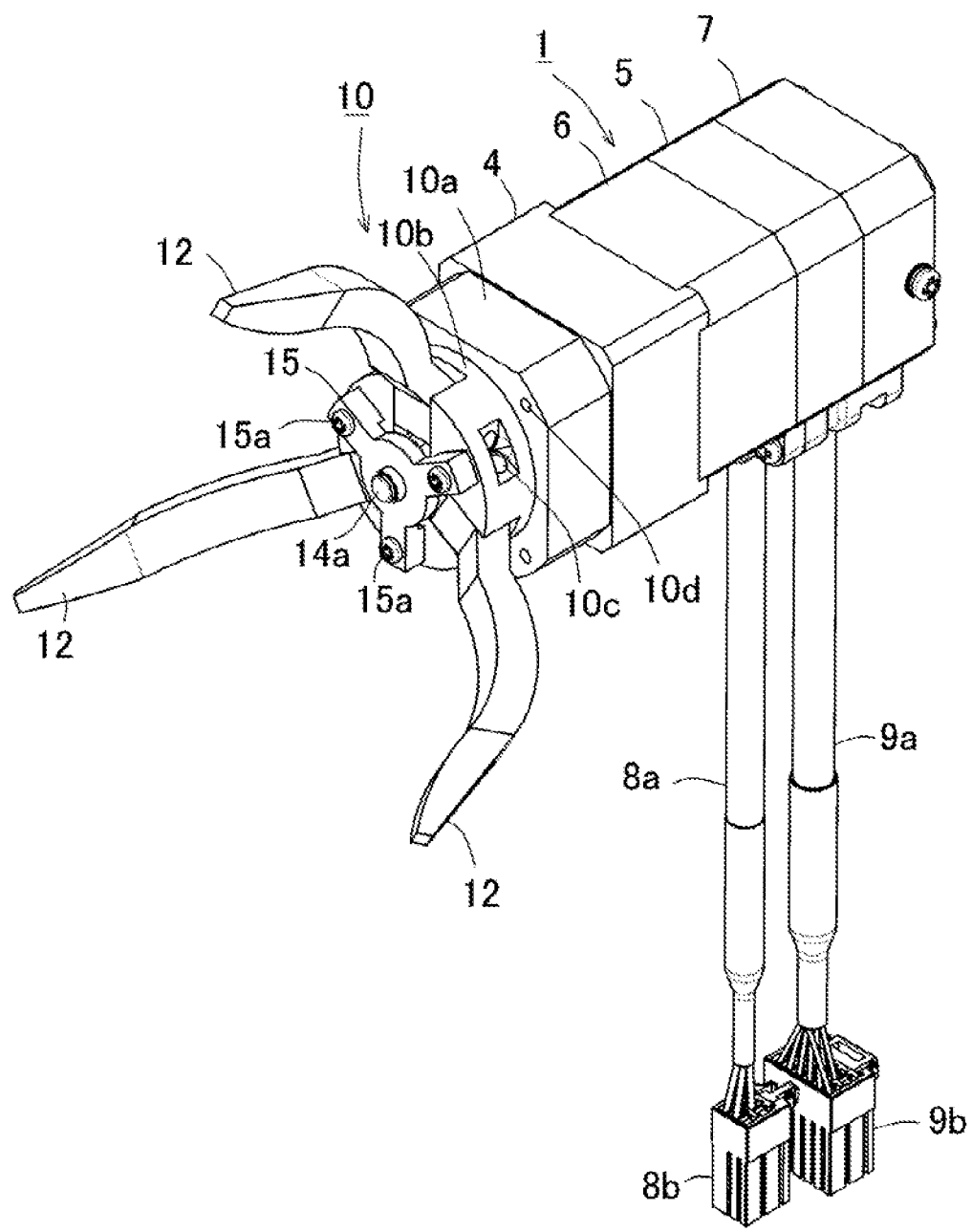
FIG. 10 is a perspective view of the cam-type hand mechanism in FIG. 6.

FIG. 6 to FIG. 10 illustrate a cam-type hand mechanism of another example in use. In this embodiment, an imaging device 14 is fixedly inserted into the hollow shaft hole 2c of the rotor shaft 2 as a functional part. As illustrated in FIG. 8, the imaging device 14 (for example, an industrial miniature camera or an endoscope camera) is inserted into the hollow shaft hole 2c of the rotor shaft 2 on the motor 1 side, and an imaging unit 14a (imaging lens portion) is fixed by an attachment 15 provided on an end surface of the cam pedestal member 11. The attachment 15 is secured to a free space of the cam pedestal member 11 with a fixing screw 15a.

A cable hose 14b of the imaging device 14 is connected to a control unit with a monitor screen.

For example, when the hand mechanism 10 is used for a surgical operation, an organ to be imaged may be imaged by the imaging device 14 via remote control in a state of being immobilized by being gripped by the claw portions 12. Therefore, an imaging action of the endoscope and a gripping action of the hand mechanism are achieved with a single hand mechanism. There are some endoscopes that are provided with the hand mechanism and the imaging device in the related art. However, the hand portion and the imaging device are disposed side by side in many of those. In contrast, according to the present invention, the imaging unit 14a is located on an extension of the rotor shaft 2, that is, at a center of the claw portions 12, and thus imaging of the gripping object gripped by the claw portions 12 is achieved without fail and an operational feeling of an operator is improved. As the structure of the related art including the hand mechanism and the imaging device requires a compact configuration for an application as an endoscope, only a hand mechanism and an imaging device having a compact configuration may be used. In contrast, according to the present invention, since the hand mechanism 10 and the imaging device 14 are disposed coaxially, the hand mechanism 10 and the imaging device 14 having a size larger than those of the related art may be mounted. Therefore, a larger gripping object may be gripped and images with higher accuracy and higher definition may be obtained.

In addition, an air blowing port may be provided instead of or in addition to the imaging unit 14a to remove dirty of a compact part gripped by the claw portions 12 of the hand mechanism 10 by blown air.

Accordingly, the operator may achieve not only the opening and closing actions of the claw portions 12, but also the imaging action and the air-blowing action of the imaging device 14 with a single hand mechanism. Consequently, a compact configuration is achieved, and improvements of operability and workability are also achieved.

Although the imaging device 14 is fixed by the attachment 15, the imaging unit 14a and the cable hose 14b continuing to the imaging unit 14a may be configured to be capable of advancing and retracting with respect to the cam pedestal member 11. Accordingly, the claw portions 12 of the hand mechanism 10 may be opened and closed while changing the imaging position by advancing and retracting the imaging device 14, and thus the imaging device 14 is capable of taking an image of the gripping object gripped by the claw portions 12 of the hand mechanism 10 by the opening and closing operations from a position in close proximity.

Examples of other possible functional parts to be inserted into the hollow shaft hole 2c of the rotor shaft 2 of the hand mechanism 10 include an air suction and injection device, an excising tool such as scissors and knife, a gripping device such as a hook, tweezers, and forceps, a cutting tool such as a drill, a file, and a router, an illumination device such as a light, a measuring device using laser beams or sound waves, an information reading device for reading data such as a bar code and a QR code (registered trademark). Note that the air suction and injection device, the excising tool, the cutting tool, the gripping device, the illumination device, the measuring device, and the information reading device may be provided individually, and may be provided in any combination thereof, or alternatively, these functional parts and the imaging device may be combined as appropriate. Accordingly, the operator may achieve an operation without fail by operating the required functional parts while watching the monitor screen.

In addition, for example, required information on the gripping object may be acquired by irradiating the gripping object gripped by the hand mechanism with, for example, laser beams or sound waves and measuring dimensions or distances, and moreover, an action of the hand mechanism may be controlled by, for example, reading various data such as a bar code or a QR code (registered trademark) marked on the gripping object.

In the above-described examples, the stepping motor is employed as the motor. However, other motors such as a DC brushless motor may also be employed.

In the above-described examples, the cam pedestal member 11 is directly attached to the rotor shaft 2. However, when the decelerator is provided, the cam pedestal member 11 may be detachably attached to a rotation transmitting member of the decelerator.

In addition, the number of the claw portions 12 to be provided on the hand mechanism 10 may be four or more, and the shapes of the claw portions 12 are not limited to the illustrations. The same applies to the cam pedestal member 11 provided with the three-dimensional cams 11b corresponding to the number of the claw portions 12.

In addition, the through hole 11e and the hollow shaft hole 2c do not have to have a circular shape and may be, for example, a polygonal shape or an elliptical shape, or may have a shape in conformity with a shape of a device to be inserted into the functional part. The functional part may be provided with a plurality of devices. For example, the imaging device and the air suction and injection device may be mounted.

What is claimed is:

1. A hand mechanism with three-dimensional cams comprising:
   a motor;
   a cam pedestal member, the cam pedestal member including a cam base portion detachably assembled directly or indirectly to a rotor shaft extending from the motor, and a three-dimensional cam including a plurality of cam guiding surfaces continuing over a range from the outer edge of a through hole provided at a center of the cam base portion to an outer peripheral side and being protruded at a plurality of positions; and a hand mechanism assembled to the motor constantly in abutment with the three-dimensional cam, the hand mechanism including a plurality of claw portions openable and closable about an axial line of the rotor shaft in association with a rotary motion of the three-dimensional cam, wherein the rotor shaft is a hollow shaft provided with a hollow shaft hole and is assembled to bring the through hole provided in the cam base portion of the cam pedestal member into communication with the hollow shaft hole, and a functional part is provided in the hollow shaft hole.

2. The hand mechanism with three-dimensional cams according to claim 1, wherein the functional part is an imaging device inserted into the hollow shaft hole.

3. The hand mechanism with three-dimensional cams according to claim 1, wherein the functional part is a storage space for storing a gripping object gripped by the claw portions into the hollow shaft hole.

4. The hand mechanism with three-dimensional cams according to claim 1, wherein the functional part is an air suction and injection device configured to suck air or inject air, and the air suction and injection device is inserted into the hollow shaft hole.

5. The hand mechanism with three-dimensional cams according to claim 1, wherein the functional part is a measuring device inserted into the hollow shaft hole.

6. The hand mechanism with three-dimensional cams according to claim 1, wherein the functional part is an information reading device inserted into the hollow shaft hole.

7. The hand mechanism with three-dimensional cams according to claim 1, wherein the hand mechanism includes: a hand base portion assembled to the motor; and claw supporting portions configured to rotatably support the claw portions about an axis orthogonally disposed with respect to a direction of the axial line of the rotor shaft, and the claw portions slide in a state in which a plurality of cam follower surfaces provided at root end portions are in constantly abutment with the plurality of corresponding cam guiding surfaces.

* * * * *